(12) United States Patent
Houser

(10) Patent No.: US 10,677,278 B2
(45) Date of Patent: Jun. 9, 2020

(54) TORQUE BUTTON LOCK CLIP

(71) Applicant: GOODRICH CORPORATION, Charlotte, NC (US)

(72) Inventor: Joshua C. Houser, Wapakoneta, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/922,699

(22) Filed: Mar. 15, 2018

(65) Prior Publication Data

US 2019/0285101 A1    Sep. 19, 2019

(51) Int. Cl.
| | |
|---|---|
| *F16D 65/04* | (2006.01) |
| *F16B 5/06* | (2006.01) |
| *F16D 65/095* | (2006.01) |
| *F16D 65/097* | (2006.01) |
| *F16B 2/24* | (2006.01) |
| *F16D 65/18* | (2006.01) |
| *B64C 25/42* | (2006.01) |
| *F16B 21/18* | (2006.01) |
| *F16D 55/36* | (2006.01) |
| *F16D 55/00* | (2006.01) |

(52) U.S. Cl.
CPC ............ *F16B 5/0664* (2013.01); *B64C 25/42* (2013.01); *F16B 2/248* (2013.01); *F16B 21/186* (2013.01); *F16D 65/095* (2013.01); *F16D 65/097* (2013.01); *F16D 65/186* (2013.01); *F16D 55/36* (2013.01); *F16D 2055/007* (2013.01); *F16D 2055/0008* (2013.01); *F16D 2055/0041* (2013.01); *F16D 2055/0058* (2013.01)

(58) Field of Classification Search
CPC .... F16B 21/12; F16B 21/1255; F16B 21/125; F16B 2/248; F16D 55/40; F16D 2065/1392
See application file for complete search history.

(56) References Cited

U.S. PATENT DOCUMENTS 1,386,918 A  *  8/1921  Westrup ............... B65H 75/406
                                                         242/388.1
1,542,493 A  *  6/1925  Coleman ................. F16B 39/04
                                                            411/340

(Continued)

FOREIGN PATENT DOCUMENTS

| KR | 20140132042 | 11/2014 |
|---|---|---|
| WO | 2007062420 | 5/2007 |

OTHER PUBLICATIONS

European Patent Office, European Search Report dated Aug. 2, 2019 in Application No. 19162864.3.

(Continued)

*Primary Examiner* — Bradley T King
(74) *Attorney, Agent, or Firm* — Snell & Wilmer LLP

(57) ABSTRACT

A clip for coupling a torque plate to an end plate of a disk brake system in accordance with various embodiments includes an inner portion having two parallel elongate members. The clip further includes an outer portion at least partially including a rounded portion that is located outward from the inner portion and has a raised end, wherein the inner portion is entirely in a same plane as the rounded portion of the outer portion, and wherein the raised end extends away from the rounded portion.

13 Claims, 3 Drawing Sheets

(56) References Cited

U.S. PATENT DOCUMENTS

| | | | | | |
|---|---|---|---|---|---|
| 1,799,934 | A | * | 4/1931 | Strid | F16B 21/12 |
| | | | | | 411/530 |
| 2,385,565 | A | * | 9/1945 | Cox | F16B 21/12 |
| | | | | | 24/665 |
| 2,589,482 | A | * | 3/1952 | Downey | F16B 21/12 |
| | | | | | 403/379.2 |
| 2,845,291 | A | * | 7/1958 | Priestman | F16B 2/248 |
| | | | | | 24/336 |
| 4,117,912 | A | * | 10/1978 | Ruppe, Jr. | F16D 55/40 |
| | | | | | 188/216 |
| 4,396,328 | A | * | 8/1983 | Barnes | F16B 21/12 |
| | | | | | 411/211 |
| 4,466,763 | A | * | 8/1984 | Fischer | F16B 21/12 |
| | | | | | 114/352 |
| 4,878,563 | A | * | 11/1989 | Baden | F16D 55/36 |
| | | | | | 188/71.5 |
| 5,219,256 | A | * | 6/1993 | Ford | F16B 21/186 |
| | | | | | 411/517 |
| 6,318,514 | B1 | | 11/2001 | Hinkens et al. | |
| 8,127,899 | B2 | | 3/2012 | Cress et al. | |
| 8,616,344 | B2 | | 12/2013 | Baden | |
| 2003/0012621 | A1 | * | 1/2003 | Fletcher | F16B 21/12 |
| | | | | | 411/513 |
| 2004/0088836 | A1 | * | 5/2004 | Mongrain | F16B 21/125 |
| | | | | | 24/546 |
| 2008/0142314 | A1 | | 6/2008 | Scelsi et al. | |

OTHER PUBLICATIONS

Abstract Machine Translation of KR20140132042 dated Oct. 29, 2019 from Espacenet (full description unavailable).

* cited by examiner

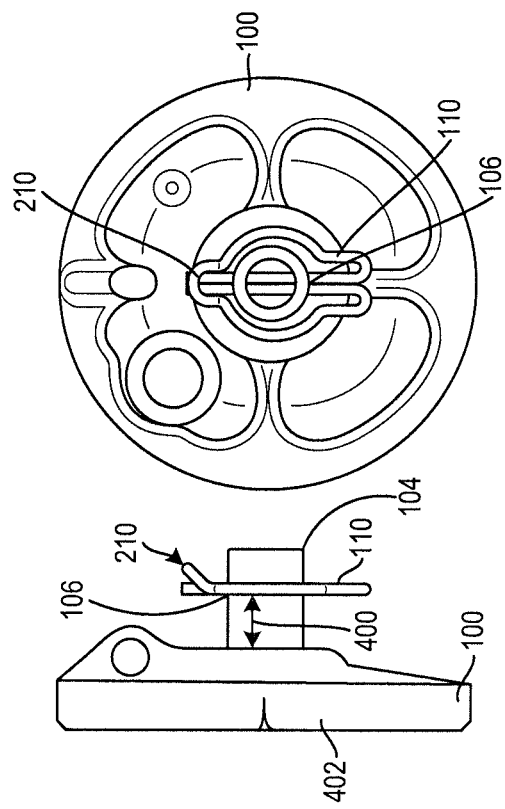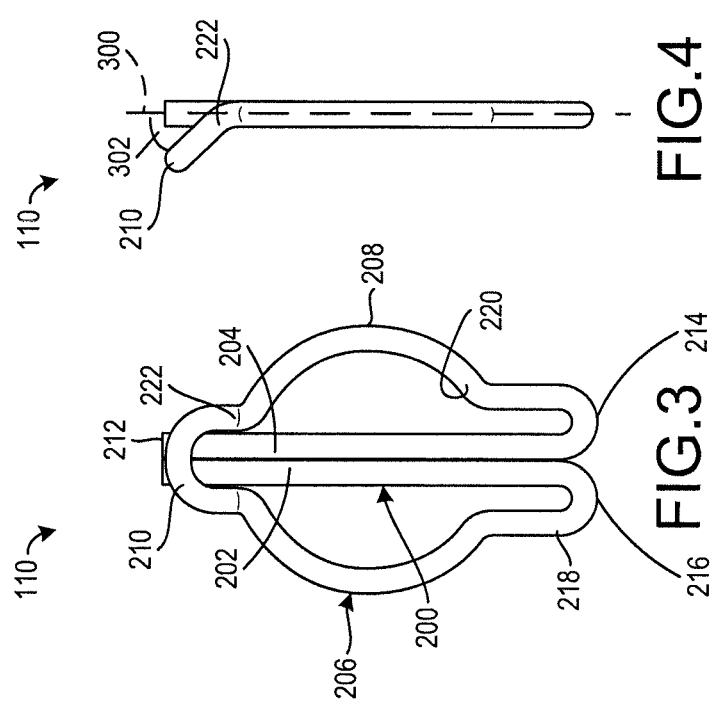

TORQUE BUTTON LOCK CLIP

FIELD

The present disclosure relates to aircraft braking systems. In particular, the disclosure relates to clips used to couple torque tubes to end plates of disk brake systems.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks are surrounded by a torque tube that is connected to a torque plate. The torque plate is coupled to a first non-rotating friction disk, called an end plate.

SUMMARY

A clip for coupling a torque plate to an end plate of a disk brake system in accordance with various embodiments includes an inner portion having two parallel elongate members. The clip further includes an outer portion at least partially including a rounded portion that is located outward from the inner portion and has a raised end, wherein the inner portion is entirely in a same plane as the rounded portion of the outer portion, and wherein the raised end extends away from the rounded portion.

In any of the foregoing embodiments, the raised end forms an angle relative to the same plane.

In any of the foregoing embodiments, the raised end is located above and aligned with a first inner end of the inner portion.

Any of the foregoing embodiments may also include first bends between the inner portion and the outer portion at a second inner end of the inner portion.

In any of the foregoing embodiments, the outer portion includes at least two parallel legs extending parallel to the two parallel elongate members of the inner portion proximate the second inner end of the inner portion.

In any of the foregoing embodiments, the outer portion further includes second bends between the at least two parallel legs and the rounded portion, the second bends at least partially forming the rounded portion.

In any of the foregoing embodiments, the first inner end of the inner portion is configured to extend through an opening of a rounded coupling feature of a torque button, and the rounded portion is configured to extend around the rounded coupling feature.

In any of the foregoing embodiments, the raised end is angled to facilitate the outer portion extending over the rounded coupling feature while the inner portion is pressed through the opening.

Also disclosed is a system for coupling a torque plate to an end plate of a disk brake system. The system includes the end plate. The system further includes a torque button coupled to the end plate and having a rounded coupling feature extending perpendicular to the end plate and defining an opening therethrough. The system further includes the torque plate defining a plate opening for receiving the rounded coupling feature. The system further includes a clip having an inner portion configured to extend through the opening of the rounded coupling feature and an outer portion configured to extend around the outer portion, the clip being configured to snap into place relative to the rounded coupling feature.

In any of the foregoing embodiments, the inner portion includes two parallel elongate members; the inner portion is entirely located in a same plane as a rounded portion of the outer portion; and the outer portion includes a raised end that extends away from the same plane.

In any of the foregoing embodiments, the raised end forms an angle relative to the same plane.

In any of the foregoing embodiments, the raised end is located above and aligned with a first inner end of the inner portion.

In any of the foregoing embodiments, the clip further includes first bends between the inner portion and the outer portion at a second inner end of the inner portion.

In any of the foregoing embodiments, the outer portion includes at least two parallel legs extending parallel to the two parallel elongate members of the inner portion proximate the second inner end of the inner portion.

In any of the foregoing embodiments, the outer portion further includes second bends between the at least two parallel legs and the rounded portion, the second bends at least partially forming the rounded portion.

In any of the foregoing embodiments, the first inner end of the inner portion is configured to extend through the opening of the rounded coupling feature of the torque button, and the rounded portion is configured to extend around the rounded coupling feature.

In any of the foregoing embodiments, the raised end is angled to facilitate the outer portion extending over the rounded coupling feature while the inner portion is pressed through the opening.

Also disclosed is a disk brake system. The disk brake system includes a plurality of friction disks. The disk brake system further includes an end plate. The disk brake system further includes at least one piston configured to compress the plurality of friction disks against the end plate. The disk brake system further includes a torque button coupled to the end plate and having a rounded coupling feature extending perpendicular to the end plate and defining an opening therethrough. The disk brake system further includes a torque plate defining a plate opening for receiving the rounded coupling feature. The disk brake system further includes a clip having an inner portion configured to extend through the opening of the rounded coupling feature and an outer portion configured to extend around the rounded coupling feature, the clip being configured to snap into place relative to the rounded coupling feature.

In any of the foregoing embodiments, the inner portion includes two parallel elongate members; the inner portion is entirely located in a same plane as a rounded portion of the outer portion; and the outer portion includes a raised end that extends away from the rounded portion.

In any of the foregoing embodiments, the raised end forms an angle relative to the same plane, and the raised end is located above and aligned with a first inner end of the inner portion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 3 illustrates a top view of the clip of FIG. 2, in accordance with various embodiments;

FIG. 4 illustrates a side view of the clip of FIG. 2, in accordance with various embodiments;

FIG. 5 illustrates a side view of the torque button and the clip of FIG. 2, in accordance with various embodiments; and FIG. 6 illustrates a top view of the torque button and the clip of FIG. 2, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
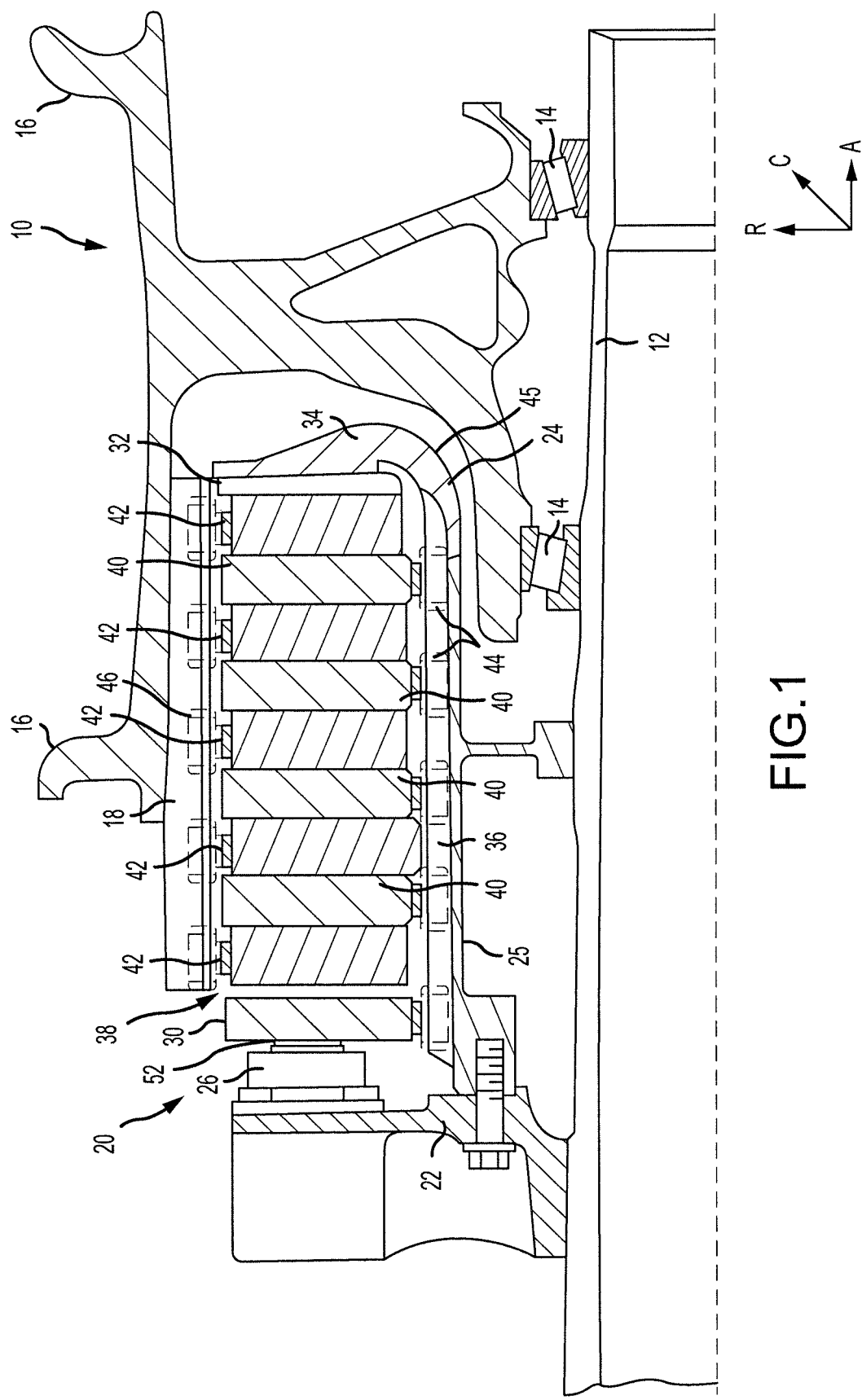
FIG. 1 illustrates a multi-disk brake system, in accordance with various embodiments.

With reference to FIG. 1, a multi-disk disk brake system 20, in accordance with various embodiments, may be used to reduce the speed of a wheel of an aircraft. An A-RC axis is shown in FIG. 1 to illustrate the axial (A), radial (R) and circumferential (C) directions. The system may include a wheel 10 supported for rotation around an axle 12 by bearings 14. The wheel 10 includes rims 16 for supporting a tire, and a series of axially extending rotor splines 18 (one shown). Rotation of the wheel 10 is modulated by the multi-disk brake system 20. The disk brake system 20 includes a torque flange 22 (which may also be referred to as a piston housing), a torque tube 24, a plurality of pistons 26 (one shown), a pressure plate 30, and an end plate 32. The torque tube 24 is an elongated annular structure that includes a barrel 25 that is positioned radially inward from one or more friction disks 38, a torque plate 34 and a series of axially extending stator splines 36 (one shown) that each engage one or more of the friction disks. In some embodiments, a barrel may also or instead enclose the friction disks 38.

The disk brake system 20 also includes a plurality of friction disks 38. The plurality of friction disks 38 includes at least one non-rotatable friction disk 40, also known as a stator, and at least one rotatable friction disk 42, also known as a rotor. Each of the friction disks 38 includes an attachment structure. In the embodiment of FIG. 1, each of four non-rotatable friction disks 40 include a plurality of stator lugs 44 at circumferentially spaced positions around the non-rotatable friction disks 40 as an attachment structure. Similarly, each of five rotatable friction disks 42 include a plurality of rotor lugs 46 at circumferentially spaced positions around the rotatable friction disks 42 as an attachment structure. In the embodiment shown in FIG. 1, the pressure plate 30, the end plate 32, and the friction disks 38 are all annular structures made at least partially from a carbon composite material.

The torque flange 22 is mounted to the axle 12. The torque tube 24 may be bolted or otherwise coupled to the torque flange 22 such that the torque plate 34 is near an axial center of the wheel 10. The end plate 32 is connected to, or is otherwise frictionally engaged with, a surface of the torque plate 34 facing axially away from the axial center of the wheel 10. Thus, the end plate 32 is non-rotatable by virtue of its connection to the torque tube 24. The stator splines 36 support the pressure plate 30 so that the pressure plate 30 is also non-rotatable. The stator splines 36 also support the non-rotatable friction disks 40. The non-rotatable friction disks 40 engage the stator splines 36 with gaps formed between the stator lugs 44. Similarly, the rotatable friction disks 42 engage the rotor splines 18 with gaps formed between the rotor lugs 46. Thus, the rotatable friction disks 42 are rotatable by virtue of their engagement with rotor splines 18 of wheel 10.

As shown in FIG. 1, the rotatable friction disks 42 are arranged with the end plate 32 on a distal end, the pressure plate 30 on a proximal end, and the non-rotatable friction disks 40 interleaved so that the rotatable friction disks 42 are adjacent to non-rotatable friction components. The pistons 26 are connected to the torque flange 22 at circumferentially spaced positions around the torque flange 22. The pistons 26 face axially toward the wheel 10 and include pucks 52 that contact a side of the pressure plate 30 opposite the rotatable friction disks 42. The pistons 26 may be powered electrically, hydraulically or pneumatically.

In various embodiments, the pucks 52 may be coupled to the torque plate 34 and corresponding mating surfaces may be positioned on the end plate 32 such that in response to actuation of the pistons 26, a force is exerted on the rotatable friction disks 42 and the non-rotatable friction disks 40 towards the torque plate 34. In response to the end plate 32 being within a predetermined distance of the torque plate 34, the pucks coupled to the torque plate 34 contact the corresponding mating surfaces such that during a rub event, the end plate 32 and the torque plate 34 make contact via the pucks and the corresponding mating surfaces. The rub event may cause undesirable vibrations that can transfer through the torque tube 24 and out the disk brake system 20.

To reduce this transfer of vibration, the torque tube 24 can include a separate barrel 25 and backleg 45 (the backleg 45 having the torque plate 34). Either part may include some or all stator splines 36. A portion of the vibration generated during compression of the friction disks 38 can be absorbed between the barrel 25 and the backleg 45 as friction heat generated therebetween. This conversion of vibration energy into heat energy desirably reduces a total amount of vibration that exits the disk brake system 20. In various embodiments, the barrel 25 and backleg 45 may be a single component.

It may be desirable for the torque plate 34 to be coupled with the end plate 32. In that regard and referring to FIG. 2, one or more torque button 100 may be placed circumferentially about the end plate 32 and may be used to couple the torque plate 34 to the end plate 32. For example, one or more fasteners 102, such as a rivet, screw, nail, or the like, may be used to fasten the torque button 100 to the end plate 32.

The torque button 100 may include a rounded coupling feature 104 that extends perpendicular to the end plate 32. The rounded coupling feature 104 may extend through a plate opening 108 defined by the torque plate 34. The rounded coupling feature 104 may define an opening 106. A clip 110 may be specifically designed to couple the torque plate 34 to the torque button 100. In particular, the clip 110 may reduce the likelihood of the rounded coupling feature 104 becoming removed from the plate opening 108 of the torque plate 34.

Figure 2:
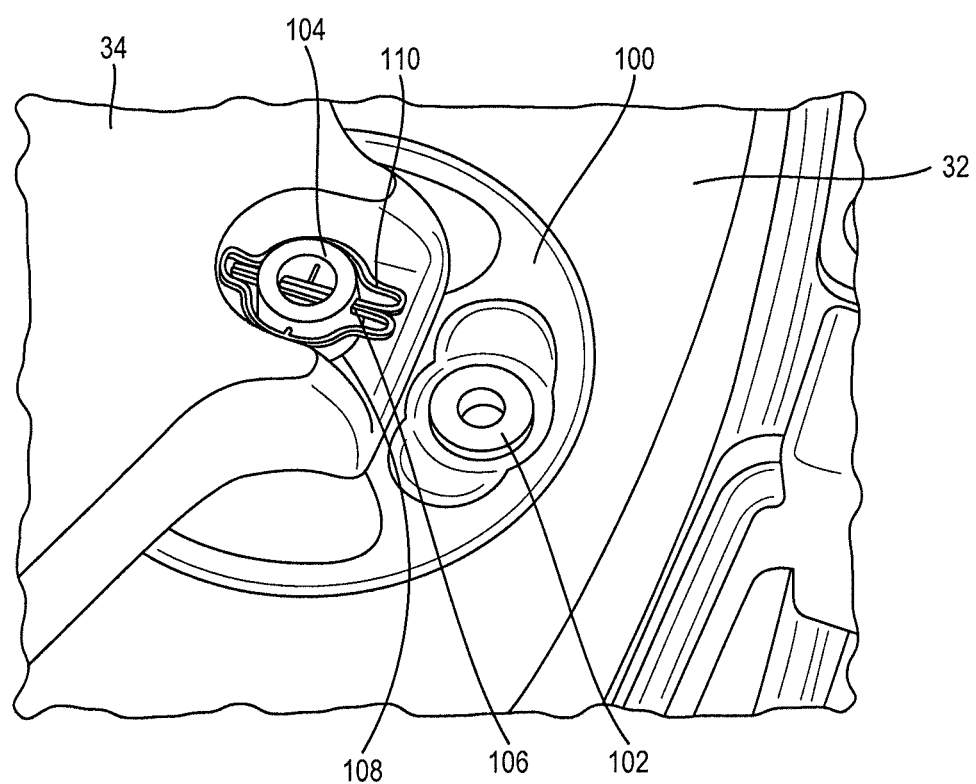
FIG. 2 illustrates a portion of the multi-disk brake system of FIG. 1 having a torque plate, an end plate, a torque button, and a clip, in accordance with various embodiments.

Referring now to FIGS. 2 and 3, the clip 110 may include an inner portion 200. The inner portion 200 may include two parallel elongate members including a first parallel elongate member 202 and a second parallel elongate member 204. The first parallel elongate member 202 may be positioned adjacent the second parallel elongate member 204. The parallel elongate members 202, 204 may extend from a first inner end 212 to a second inner end 214. The parallel elongate members 202, 204 may be designed to extend through the opening 106 of the rounded coupling feature 104.

The clip 110 may further include an outer portion 206. The outer portion 206 may be located outward from the inner portion 200. The clip 110 may further include first bends 216 that provide a transition from the inner portion 200 to the outer portion 206. The outer portion 206 may include at least two parallel legs 218 on either side that are oriented parallel to the parallel elongate members 202, 204 of the inner portion 200.

The outer portion 206 may also include a rounded portion 208. The size and shape of the rounded portion 208 may match that of the rounded coupling feature 104 such that the rounded portion 208 may extend around the rounded coupling feature 104. The outer portion 206 may further include second bends 220 that provide a transition from the parallel legs 218 to the rounded portion 208.

Referring now to FIGS. 2, 3, and 4, the outer portion 206 may further include a raised end 210. As shown in FIG. 4, the inner portion 200, the parallel legs 218, and the rounded portion 208 all lay along a same plane 300. However, the raised end 210 may extend away from the same plane 300 by an angle 302 (i.e., the raised end 210 may be angled). The outer portion 206 may further define a third bend 222 that provides transition from the rounded portion 208 to the raised end 210. The raised end may be located above and aligned with the first inner end 212 of the inner portion 200. In various embodiments, the raised end may be located closer to, or further from, the second inner end 214 than the first inner end 212.

In order to insert the clip into the rounded coupling feature 104, the inner end 212 of the parallel elongate members 202, 204 may be inserted into the opening 106. As force is applied to urge the parallel elongate members 202, 204 through the opening 106, the angle 302 formed by the raised end 210 (located above the parallel elongate members 202, 204) may cause the raised end 210, along with the rest of the outer portion 206, to extend above the rounded coupling feature 104. Force may be continued to be applied to the clip 110 in a direction from the second inner end 214 towards the first inner end 212 until the rounded portion 208 of the outer portion 206 is aligned with the rounded coupling feature 104. At that point, the outer portion 206 will become lowered such that the rounded portion 208 of the clip 110 lowers and encircles the rounded coupling feature 104. At this time, the parallel elongate members 202, 204 may extend entirely through the opening 106 and exit on an opposing side from which they entered.

In response to the clip 110 being in this position, the clip 110 will reduce the likelihood of the torque plate 34 separating from the torque button 100. Due to the fastener 102 coupling the torque button 100 to the end plate 32, the clip 110 will reduce the likelihood of the torque plate 34 becoming separated from the end plate 32.

Turning to FIGS. 5 and 6, side and front views, respectively, of the clip 110 and the torque button 100 are shown. As shown, the opening 106 of the torque button 100 (on the rounded coupling feature) is located a distance 400 from a main body 402 of the torque button 100. Stated differently, the opening 106 of the torque button 100 may be separate from the main body 402 of the torque button 100. This may allow relative axial movement of the torque plate 34 relative to the end plate 32 as shown in FIG. 2.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clip for coupling a torque plate to an end plate of a disk brake system, the clip comprising:
   an inner portion having two parallel elongate members each extending from a first end of the clip to a second end of the clip; and
   an outer portion at least partially including a rounded portion that is located outward from the inner portion and has a raised end, wherein the inner portion has a surface that is entirely in a same plane as a surface of the rounded portion of the outer portion, and wherein the raised end extends away from the same plane,
   wherein the raised end forms an angle relative to the same plane, and
   wherein the raised end is located above and aligned with a first inner end of the inner portion.

2. The clip of claim 1, further comprising first bends between the inner portion and the outer portion at a second inner end of the inner portion.

3. The clip of claim 2, wherein the outer portion includes at least two parallel legs extending parallel to the two parallel elongate members of the inner portion proximate the second inner end of the inner portion.

4. The clip of claim 3, wherein the outer portion further includes second bends between the at least two parallel legs and the rounded portion, the second bends at least partially forming the rounded portion.

5. The clip of claim 1, wherein the first inner end of the inner portion is configured to extend through an opening of a rounded coupling feature of a torque button, and the rounded portion is configured to extend around the rounded coupling feature.

6. The clip of claim 5, wherein the raised end is angled to facilitate the outer portion extending over the rounded coupling feature while the inner portion is pressed through the opening.

7. A system for coupling a torque plate to an end plate of a disk brake system, comprising:
   the end plate;
   a torque button coupled to the end plate and having a rounded coupling feature extending perpendicular to the end plate and defining an opening therethrough;
   the torque plate defining a plate opening for receiving the rounded coupling feature; and
   a clip having an inner portion with two parallel elongate members each extending from a first end of the clip to a second end of the clip and configured to extend through the opening of the rounded coupling feature, and an outer portion configured to extend around the rounded coupling feature, the clip being configured to snap into place relative to the rounded coupling feature, wherein:
   the inner portion has a surface that is entirely in a same plane as a surface of a rounded portion of the outer portion,
   the outer portion includes a raised end that extends away from the same plane,
   the raised end forms an angle relative to the same plane, and
   the clip further includes first bends between the inner portion and the outer portion at a second inner end of the inner portion.

8. The system of claim 7, wherein the clip further includes first bends between the inner portion and the outer portion at a second inner end of the inner portion.

9. The system of claim 8, wherein the outer portion includes at least two parallel legs extending parallel to the two parallel elongate members of the inner portion proximate the second inner end of the inner portion.

10. The system of claim 9, wherein the outer portion further includes second bends between the at least two parallel legs and the rounded portion, the second bends at least partially forming the rounded portion.

11. The system of claim 7, wherein the first inner end of the inner portion is configured to extend through the opening of the rounded coupling feature of the torque button, and the rounded portion is configured to extend around the rounded coupling feature.

12. The system of claim 11, wherein the raised end is angled to facilitate the outer portion extending over the rounded coupling feature while the inner portion is pressed through the opening.

13. A disk brake system, comprising:
   a plurality of friction disks;
   an end plate;
   at least one piston configured to compress the plurality of friction disks against the end plate;
   a torque button coupled to the end plate and having a rounded coupling feature extending perpendicular to the end plate and defining an opening therethrough;
   a torque plate defining a plate opening for receiving the rounded coupling feature; and
   a clip having an inner portion with two parallel elongate members each extending from a first end of the clip to a second end of the clip and configured to extend through the opening of the rounded coupling feature, and an outer portion configured to extend around the rounded coupling feature, the clip being configured to snap into place relative to the rounded coupling feature, wherein:
   the inner portion has a surface that is entirely in a same plane as a surface of a rounded portion of the outer portion,
   the outer portion includes a raised end that extends away from the rounded portion, and
   the raised end forms an angle relative to the same plane, and the raised end is located above and aligned with a first inner end of the inner portion.

* * * * *